(12) United States Patent
Kawai et al.

(10) Patent No.: US 10,981,513 B2
(45) Date of Patent: Apr. 20, 2021

(54) CENTER CONSOLE STRUCTURE

(71) Applicant: MAZDA MOTOR CORPORATION, Hiroshima (JP)

(72) Inventors: Hiroyuki Kawai, Hiroshima (JP); Masanori Taguchi, Hiroshima (JP); Eiji Okada, Hiroshima (JP); Junko Karube, Hatsukaichi (JP); Yamato Matsuda, Hiroshima (JP); Yohichi Yanagi, Higashihiroshima (JP); Kazuki Hikawa, Hiroshima (JP); Junko Nakamura, Hiroshima (JP); Koji Miyamoto, Hiroshima (JP); Atsuo Iwabuchi, Higashihiroshima (JP); Hidehiko Soda, Hiroshima (JP); Ryoichi Hashimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 63 days.

(21) Appl. No.: 16/426,485

(22) Filed: May 30, 2019

(65) Prior Publication Data
US 2019/0366936 A1    Dec. 5, 2019

(30) Foreign Application Priority Data
May 30, 2018    (JP) .............................. JP2018-103223

(51) Int. Cl.
*B60R 7/04*    (2006.01)
*B60R 11/00*   (2006.01)

(52) U.S. Cl.
CPC .......... *B60R 7/04* (2013.01); *B60K 2370/774* (2019.05); *B60R 2011/0007* (2013.01)

(58) Field of Classification Search
CPC ..... B60R 7/04; B60R 7/06; B60R 2011/0007; B60R 11/0235; B60R 2370/77
(Continued)

(56) References Cited

U.S. PATENT DOCUMENTS 4,998,770 A * 3/1991 Shimizu .................... B60R 7/04
                                                        296/37.8
6,123,377 A * 9/2000 Lecher ............... B60H 1/00985
                                                      296/24.34
(Continued)

FOREIGN PATENT DOCUMENTS

JP    S58-194641 A    11/1983
JP    2013-237286 A   11/2013
(Continued)

OTHER PUBLICATIONS

The extended European search report issued by the European Patent Office dated Jul. 26, 2019, which corresponds to European Patent Application No. 19177316.7-1132 and is related to U.S. Appl. No. 16/426,485.

*Primary Examiner* — Jason S Morrow
(74) *Attorney, Agent, or Firm* — Studebaker & Brackett PC (57) ABSTRACT

A center console structure includes a columnar part erected on a vehicle interior floor surface between a driver seat and a passenger seat and extends upward to the vicinity of the cushion surfaces of the seats and an upper body that is disposed above the columnar part, extends in a front-rear direction, has an upper surface part forming a center console surface, and accommodates a shift operation mechanism, in which the upper body extends forward of the columnar part that is cantilevered and has an extension part that is bent and then rises forward and obliquely upward in the front part thereof, a surface part of the extension part close to a sitting occupant forms an outer surface continuous with the center console surface and a portion of the extension part close to the front of the vehicle is locked to a rear projecting part of an instrument panel.

2 Claims, 12 Drawing Sheets

(58) Field of Classification Search
USPC .................................................. 296/24.34
See application file for complete search history.

(56) References Cited

U.S. PATENT DOCUMENTS

| | | | | |
|---|---|---|---|---|
| 7,513,550 | B1* | 4/2009 | Abro | B60R 7/04 |
| | | | | 296/24.34 |
| 2004/0130184 | A1* | 7/2004 | Matsuoka | B62D 21/15 |
| | | | | 296/187.01 |
| 2007/0158966 | A1* | 7/2007 | Tomasson | B60R 13/0262 |
| | | | | 296/24.34 |
| 2007/0296234 | A1* | 12/2007 | Sturt | B60R 7/04 |
| | | | | 296/24.34 |
| 2010/0013256 | A1* | 1/2010 | Arndt | B60R 7/04 |
| | | | | 296/24.34 |
| 2011/0006557 | A1* | 1/2011 | Koizumi | B60R 7/04 |
| | | | | 296/37.8 |
| 2015/0353020 | A1* | 12/2015 | Dassen | B60N 3/08 |
| | | | | 296/37.14 |
| 2017/0080860 | A1* | 3/2017 | Yoda | H04N 7/183 |
| 2017/0147270 | A1* | 5/2017 | Kim | G09G 5/12 |
| 2018/0194304 | A1* | 7/2018 | Hupman | B60R 11/02 |
| 2018/0319305 | A1* | 11/2018 | White | B60N 2/753 |
| 2019/0161134 | A1* | 5/2019 | Rossetti | B62J 17/04 |
| 2019/0366934 | A1* | 12/2019 | Kishimoto | B60N 2/793 |
| 2019/0366935 | A1* | 12/2019 | Kawai | B60R 7/04 |

FOREIGN PATENT DOCUMENTS

| | | |
|---|---|---|
| JP | 2014-133503 A | 7/2014 |
| WO | 2010-035542 A1 | 4/2010 |

* cited by examiner

CENTER CONSOLE STRUCTURE

TECHNICAL FIELD

The present application relates to a center console structure that is disposed between a driver seat and a passenger seat and has a shift operation mechanism thereon.

BACKGROUND ART

Generally, a transmission operation mechanism is provided on the upper surface of a center console and this transmission operation mechanism is coupled to a transmission via a link member and the like.

In recent years, a transmission operation mechanism or shift operation mechanism and a parking brake have been electronically achieved. When the transmission operation mechanism and the parking brake are electronically achieved, because a transmission operation and braking are performed by electronic signals instead of a conventional mechanical coupling structure using a link member and the like, the link member becomes unnecessary.

Accordingly, the space below the center console in which the link member has been conventionally disposed can be used as a storage or a design element.

Patent document 1 discloses a center console structure that has a space for an operation panel in a position above the center console and behind an instrument panel provided in a vehicle interior and has a display device on the rising surface of the operation panel.

In addition, patent document 2 discloses a center console structure in which a rear console member is provided behind a console member extending along a floor surface in a front-rear direction of a vehicle, an arm rest member is provided above this rear console member, the instrument panel is coupled to the preceding part of the arm rest member by a bridge-shaped shift panel, and a shift knob of a shift operation part is disposed on the shift panel.

However, patent documents 1 and 2 do not disclose the addition of visual floating feeling to the upper body of the center console.

Patent Documents

Patent document 1: JP-A-2013-237286
Patent document 2: JP-A-2010-076607

SUMMARY

Accordingly, an object of the present application is to provide the center console structure capable of adding visual floating feeling to the upper body of the center console.

According to the present application, there is provided a center console structure that is disposed between a driver seat and a passenger seat and has a shift operation mechanism thereon, the center console structure including a columnar part erected on a vehicle interior floor surface between the driver seat and the passenger seat, the columnar part extending upward to vicinity of cushion surfaces of the seats; and an upper body that is disposed above the columnar part, extends in a front-rear direction, has an upper part forming a center console surface, and accommodates the shift operation mechanism, in which the upper body extends forward of the columnar part like a cantilever, has, in a front part thereof, an extension part that is bent and then rises forward and obliquely upward, a surface part of the extension part close to a sitting occupant forms an outer surface continuous with the center console surface and a portion of the extension part close to a front of the vehicle is locked to a rear projecting part of an instrument panel.

In the structure, the visual floating feeling of the upper body can be provided for the occupant by terminating the extension part of the upper body of the center console in the proximity of the rear projecting part of the instrument panel. On the other hand, the supporting strength of the upper body can be obtained even when the upper body has a cantilever shape by locking the portion of the extension part close to the front of the vehicle to the rear projecting part of the instrument panel.

In one aspect of the present application, a display device that displays vehicle-related information is accommodated in the extension part and a display surface is disposed in the surface part close to the sitting occupant. In this structure, by providing the display device, which is originally provided in the instrument panel, in the extension part that rises forward and obliquely upward of the center console, the display device can be disposed close to the occupant, the visibility of the display surface is improved, and the instrument panel can be simplified.

In one aspect of the present application, a first engagement part is provided in a portion of the extension part close to the front of the vehicle, a second engagement part to be engaged with the first engagement part is provided in a rear projecting part of the instrument panel, and a space through which the first engagement part and the second engagement part are accessed from above for engagement is provided between an upper front edge part of the extension part and the rear projecting part of the instrument panel.

In this structure, because the first engagement part close to the extension part can be surely engaged with the second engagement part close to the instrument panel and engagement work for both engagement parts can be performed by access through the space, the workability thereof can be improved. In addition, because the front end part or front end side of the extension part of the upper body seems to the sitting occupant to float in the rear projecting part of the instrument panel due to the space, visual floating feeling can be improved.

The present application has the effect of adding visual floating feeling to the upper body of the center console.

DETAILED DESCRIPTION

The addition of visual floating feeling to an upper body of a center console is achieved by a center console structure that is disposed between a driver seat and a passenger seat and has a shift operation mechanism thereon, the center console structure including a columnar part erected on a vehicle interior floor surface between the driver seat and the passenger seat, the columnar part extending upward to vicinity of cushion surfaces of the seats; and an upper body that is disposed above the columnar part, extends in a front-rear direction, has an upper part forming a center console surface, and accommodates the shift operation mechanism, in which the upper body extends forward of the columnar part and is cantilevered, has, in a front part thereof, an extension part that is bent and then rises forward and obliquely upward, a surface part of the extension part close to a sitting occupant forms an outer surface continuous with the center console surface and a portion of the extension part close to a front of the vehicle is locked to a rear projecting part of an instrument panel.

Figure 1:
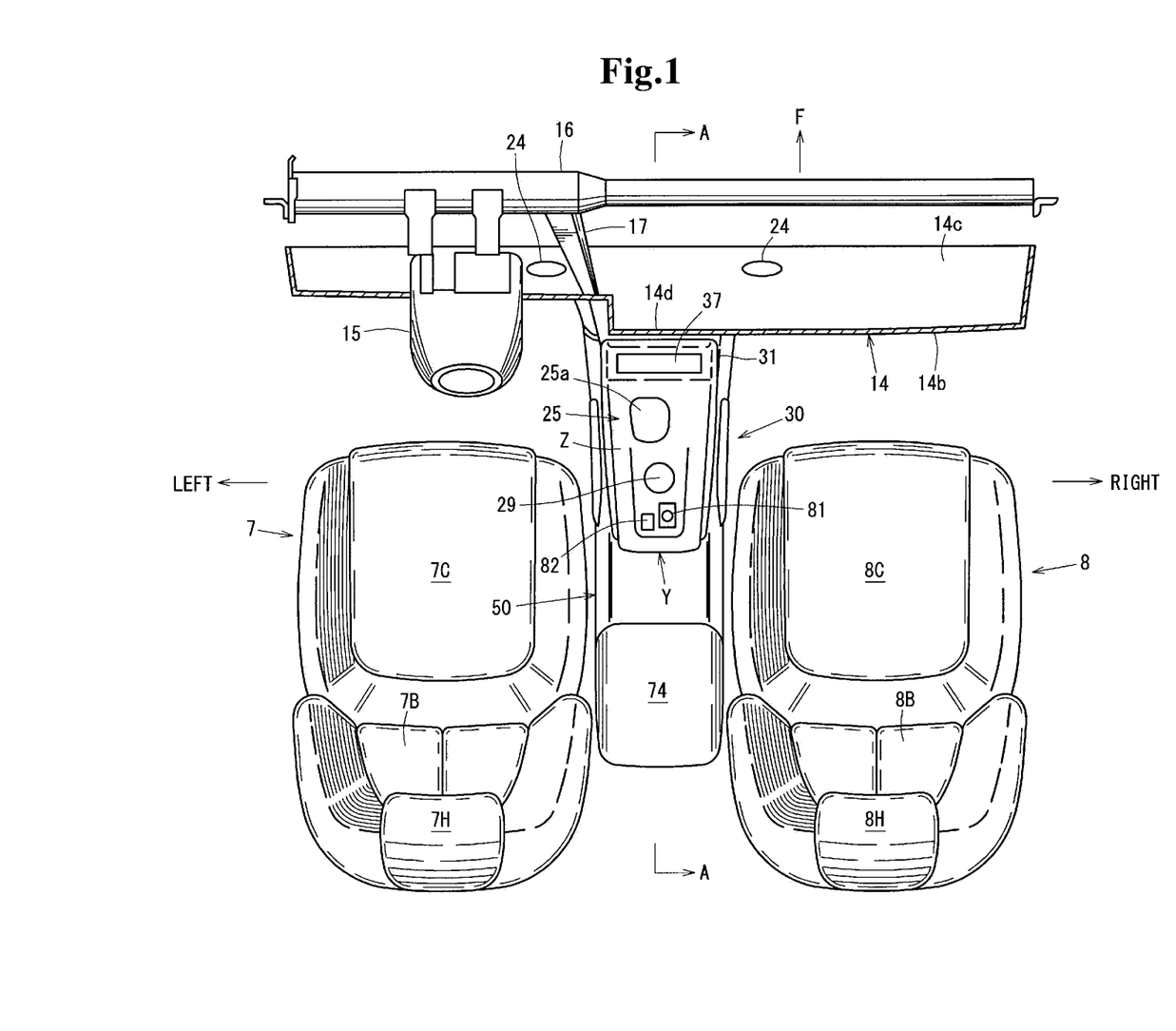
FIG. 1 is a plan view illustrating a center console structure according to the present application.

A tunnel part 5 extending in the front-rear direction of the vehicle while jutting to the vehicle interior is formed integrally or approximately integrally with the floor panel 2 in the middle part in the vehicle width direction of the floor panel 2. In this embodiment, the tunnel part 5 is formed so as to extend in the front-rear direction of the vehicle between the dash lower panel 1 and a kick-up part 6 in the rear part. As illustrated in FIG. 1, a driver seat 7 and a passenger seat 8 as front seats are provided to the left and the right of the floor panel 2. The driver seat 7 includes a seat cushion 7C that forms a seating surface for an occupant, a seat back 7B that forms a backrest for the occupant, and a head rest 7H that holds the head of the occupant.

Figure 4:
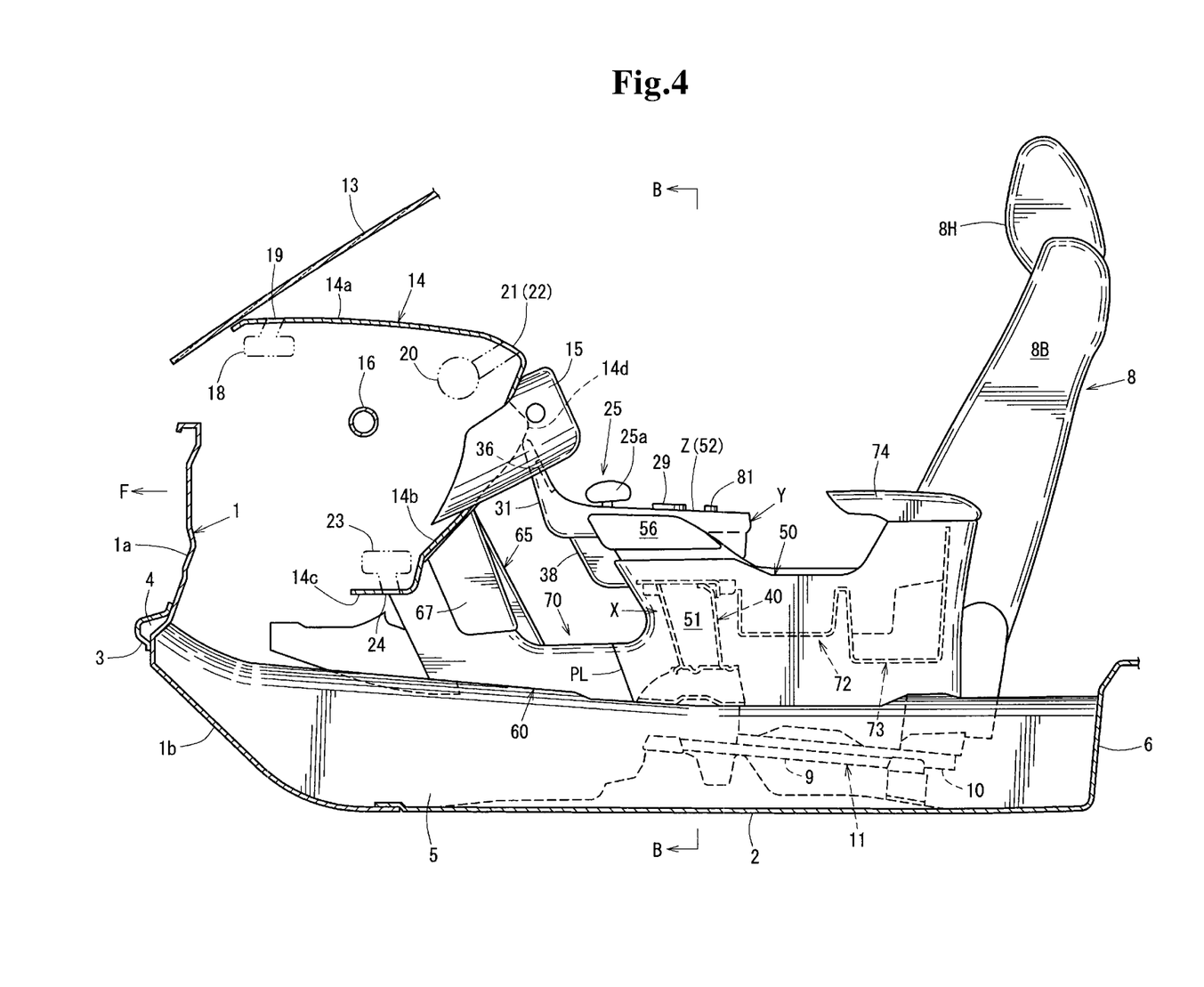
FIG. 4 is a side view illustrating the center console structure seen from the left side of the vehicle.
Figure 5:
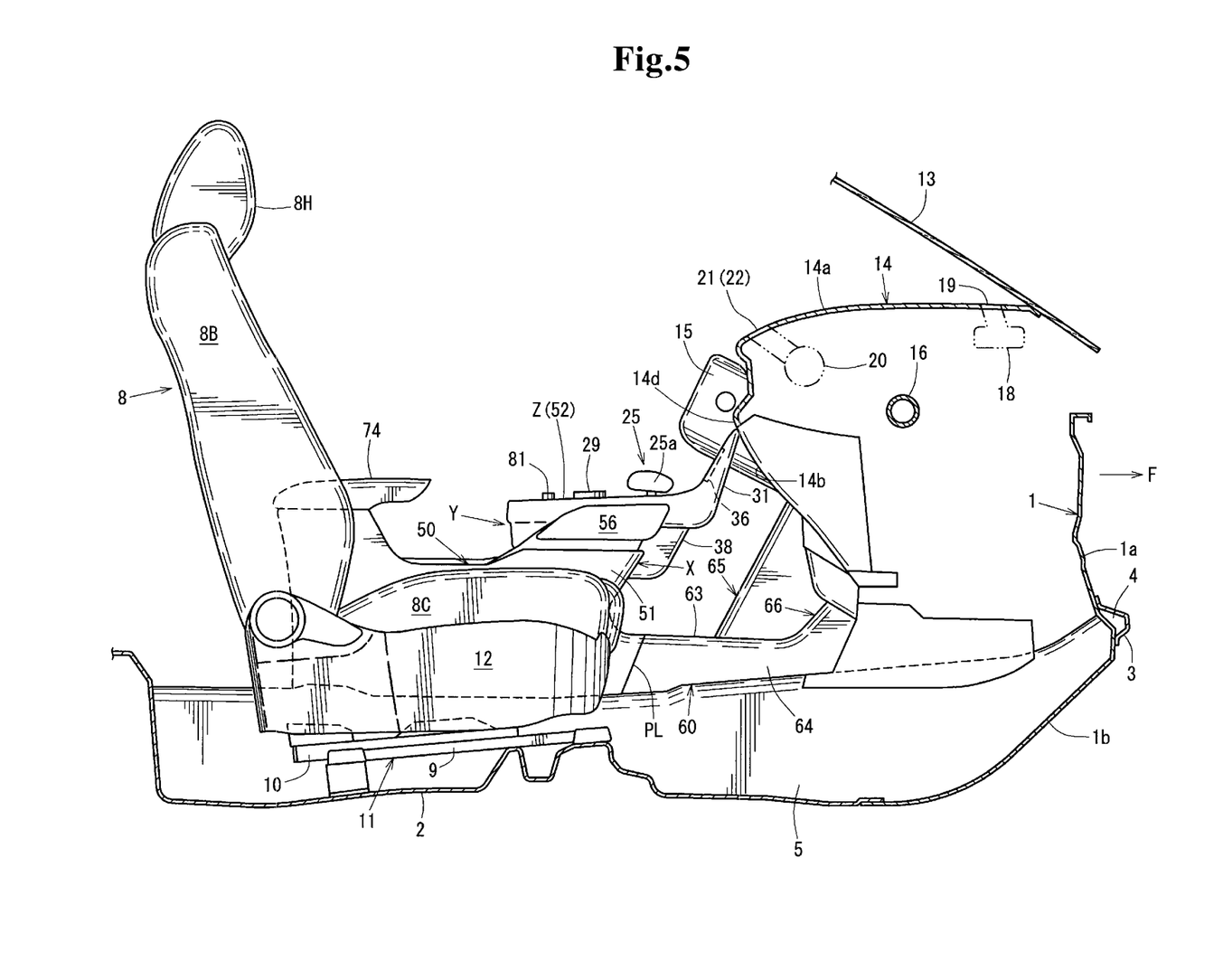
FIG. 5 is a side view illustrating the center console structure seen from the right side of the vehicle.

Similarly, the passenger seat 8 also includes a seat cushion 8C that forms a seating surface for an occupant, a seat back 8B that forms a backrest for the occupant, and a head rest 8H that holds the head of the occupant. As illustrated in FIG. 4 and FIG. 5, the passenger seat 8 is provided via a seat slide rail 11 including a lower rail 9 and an upper rail 10 and a seat frame 12 and the position of the passenger seat 8 in the front-rear direction of the vehicle can be adjusted according to the physique of the occupant in the passenger seat.

As in the passenger seat 8, the driver seat 7 is also provided via a seat slide rail including a lower rail and an upper rail and a seat frame and the position of the driver seat 7 in the front-rear direction of the vehicle can be adjusted according to the physique of the occupant in the driver seat.

In FIG. 4 and FIG. 5, reference numeral 13 represents a front window glass and reference numeral 14 represents an instrument panel. As illustrated in these drawings, the instrument panel 14 has an upper surface part 14a extending substantially in the front-rear direction, a rear surface part 14b extending downward and forward from the rear end of this upper surface part 14a, and a lower surface part 14c extending from the lower end of this rear surface part 14b toward the front of the vehicle. A steering column cover 15 is provided in a part of the instrument panel 14 close to the driver seat 7.

As illustrated in FIG. 1 to FIG. 5, an instrument panel member 16 as a strengthening member that extends in the vehicle width direction and couples left and right hinge pillars is provided inside the instrument panel 14. In the instrument panel member 16, a part of this instrument panel member 16 close to the driver seat 7 has a larger diameter than a part of this instrument panel member 16 close to the passenger seat 8 as illustrated in FIG. 1 to prevent the occupants from offset collision. In addition, as illustrated in FIG. 1, a support stay 17 runs between the instrument panel member 16 and the tunnel part 5 so that this single support stay 17 supports the instrument panel member 16.

Figure 2:
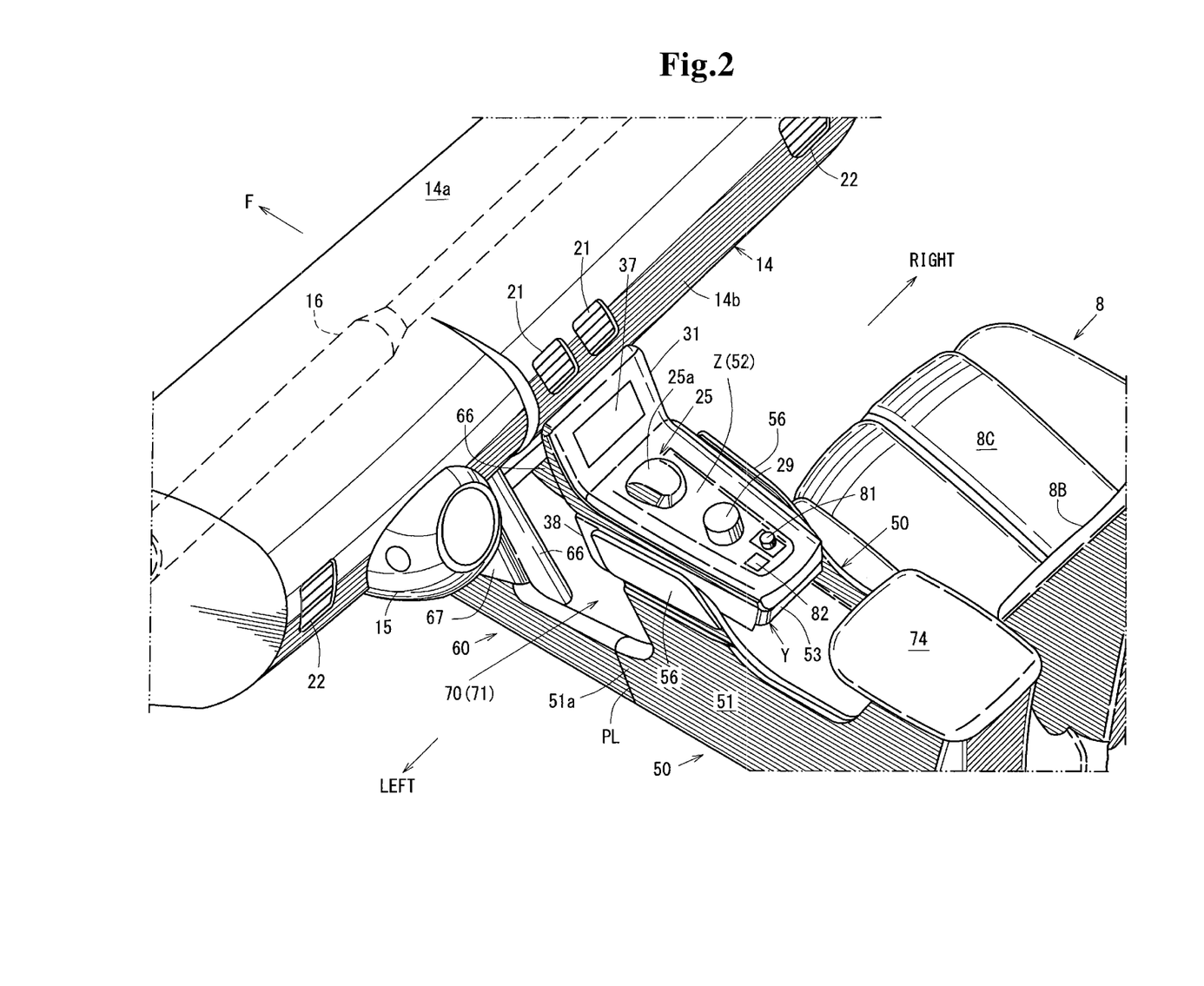
FIG. 2 is a perspective view illustrating the center console structure seen from oblique upper left of a vehicle.

As illustrated in FIG. 4, a defroster blowout port 19 communicating with a defroster duct 18 is opened in a part of the instrument panel 14 facing a slant lower part of the front window glass 13 so as to prevent the fogging of the front window glass 13. As illustrated in FIG. 2 and FIG. 4, a center vent blowout port 21 and a side vent blowout port 22 that communicate with a vent duct 20 are opened and formed in parts of the instrument panel 14 that face the face parts of the occupants.

As illustrated in FIG. 4, foot blowout ports 24 that communicate with a foot duct, or heat duct 23 are opened and formed in parts of the instrument panel 14 that face the foot spaces for the occupants sitting in the driver seat 7 and the passenger seat 8.

Figure 6:
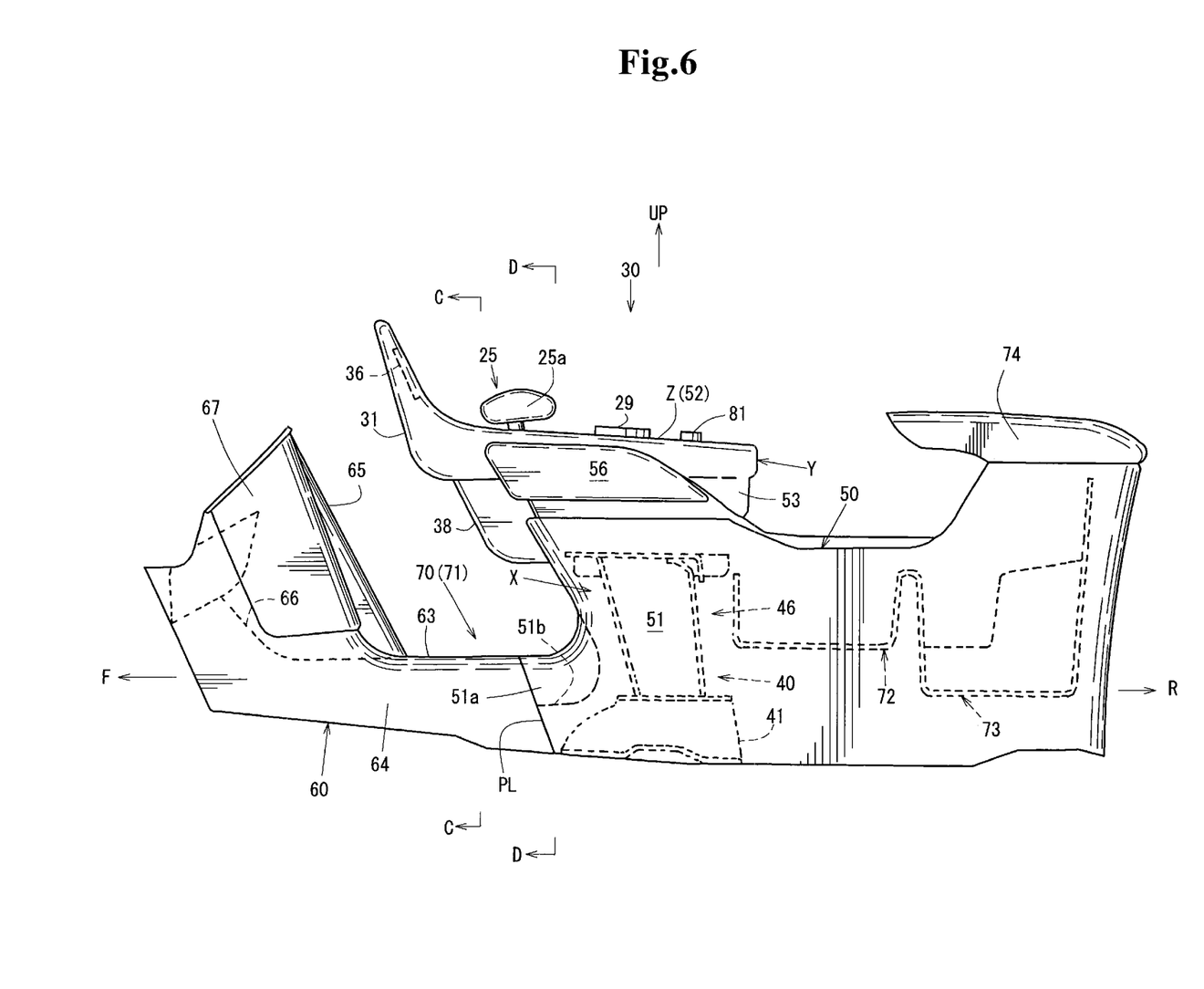
FIG. 6 is a side view illustrating a center console.
Figure 7:
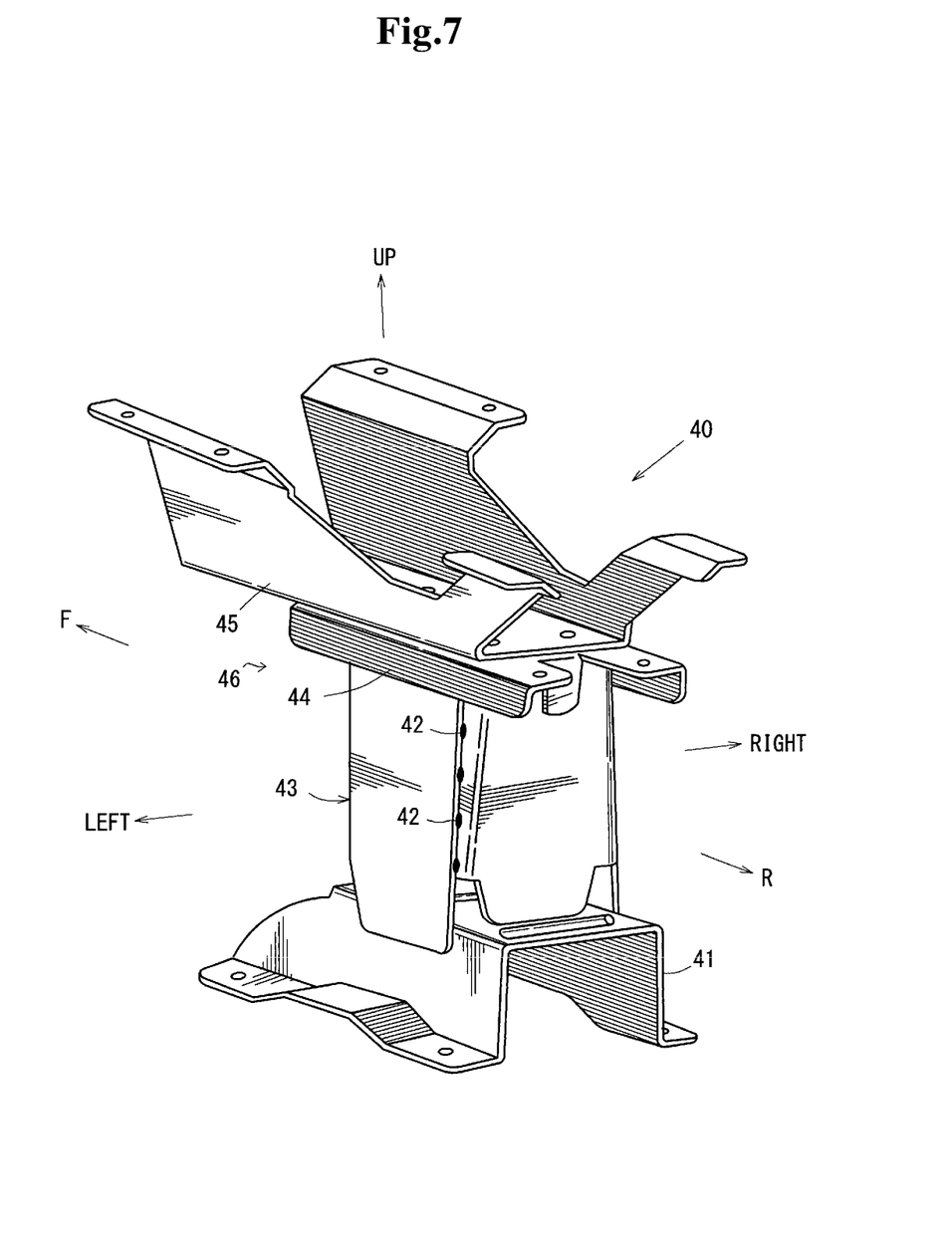
FIG. 7 is a perspective view illustrating an internal frame.
Figure 8:
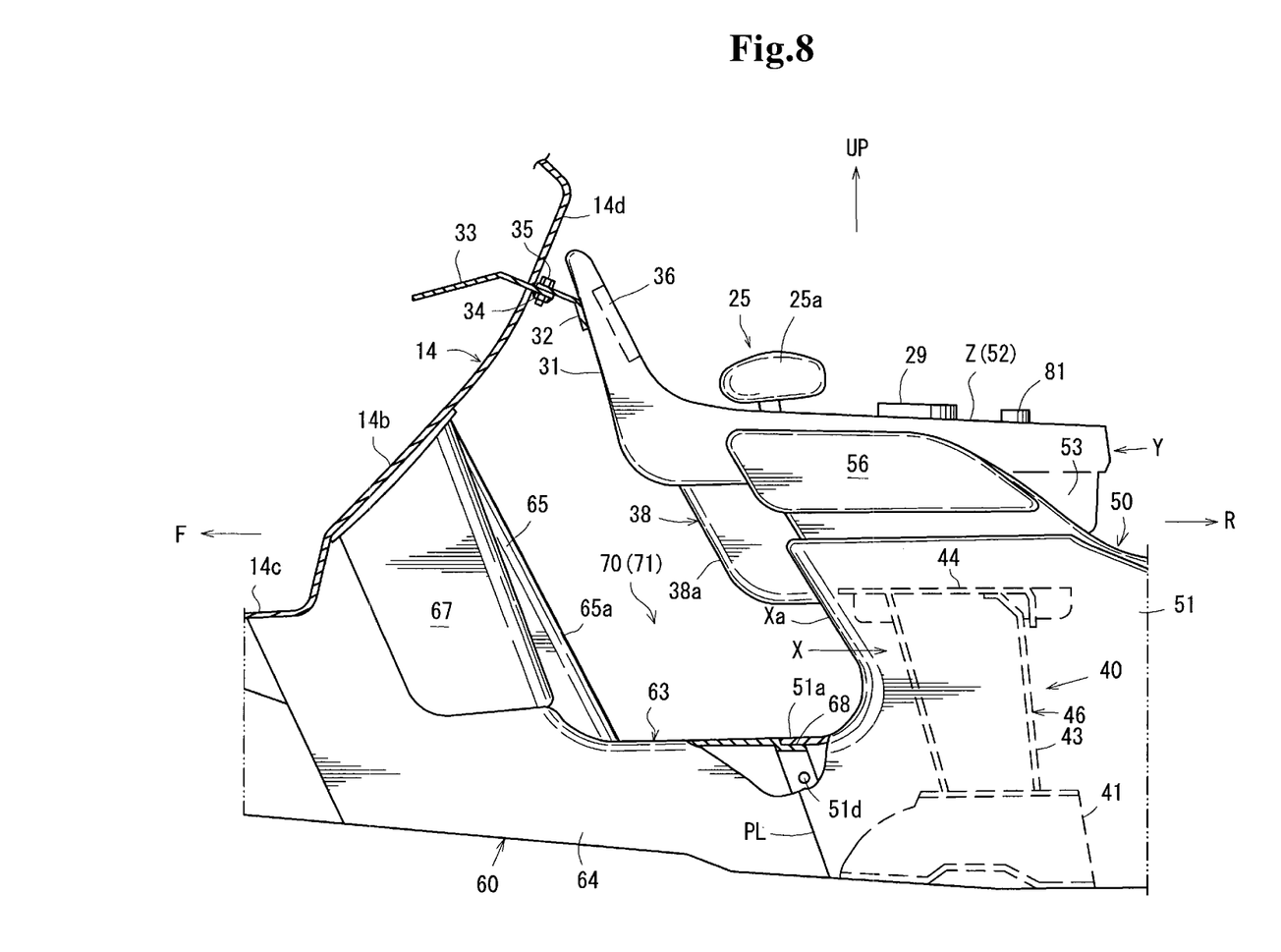
FIG. 8 is an enlarged side view illustrating a main part in FIG. 4.
Figure 9:
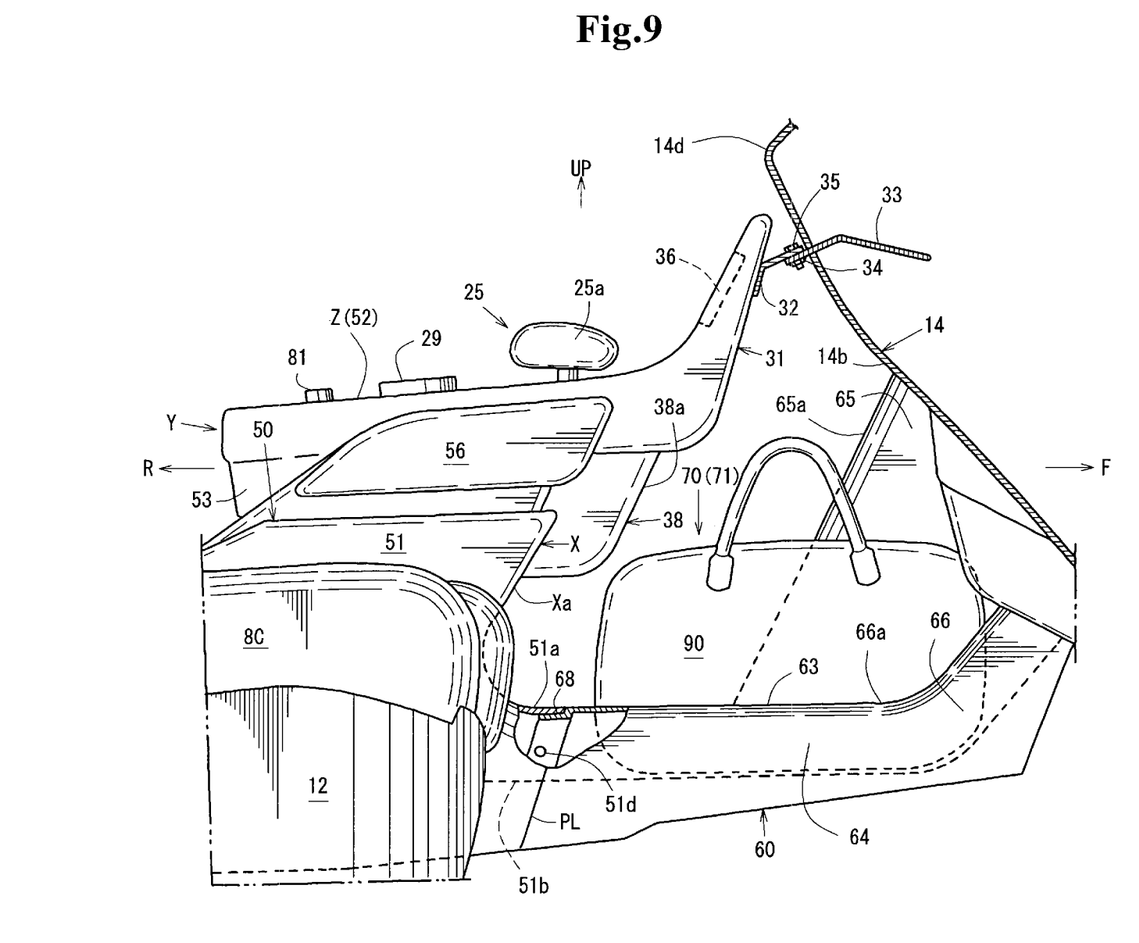
FIG. 9 is an enlarged side view illustrating a main part in FIG. 5.
Figure 10:
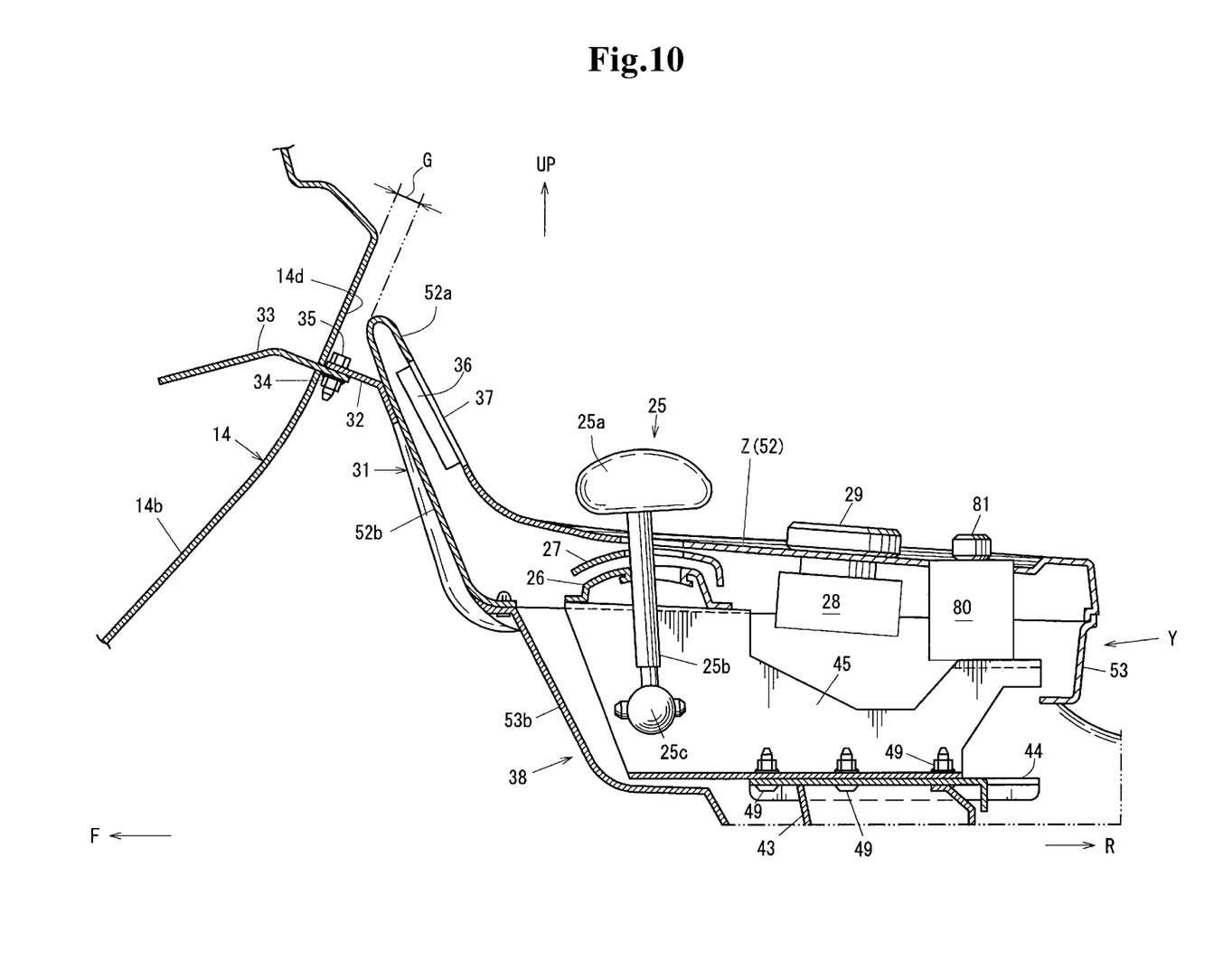
FIG. 10 is a cross sectional view illustrating a main part seen along arrows A-A in FIG. 1.
Figure 11:
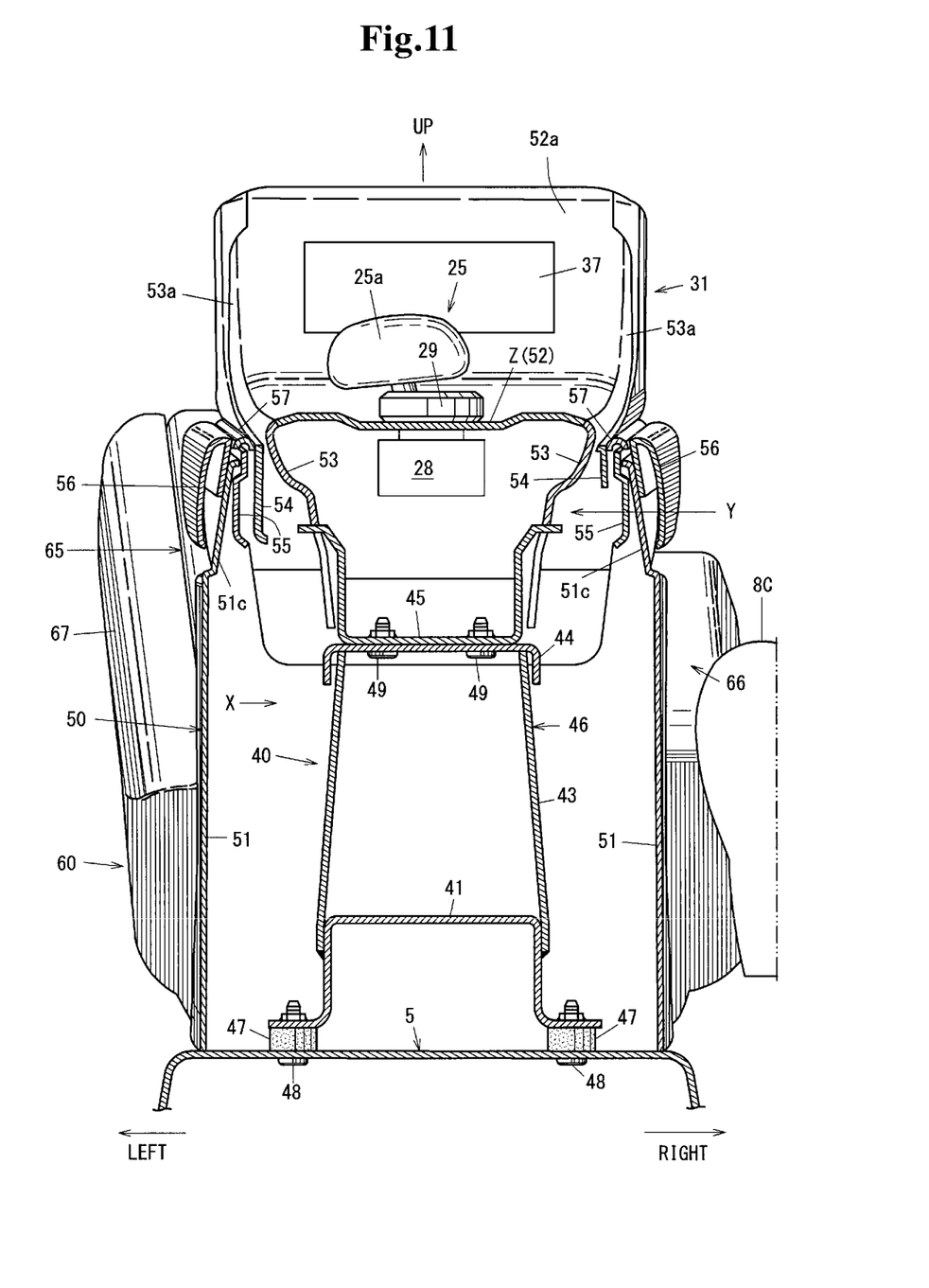
FIG. 11 is a cross sectional view illustrating a main part seen along arrows B-B in FIG. 4.
Figure 12A:
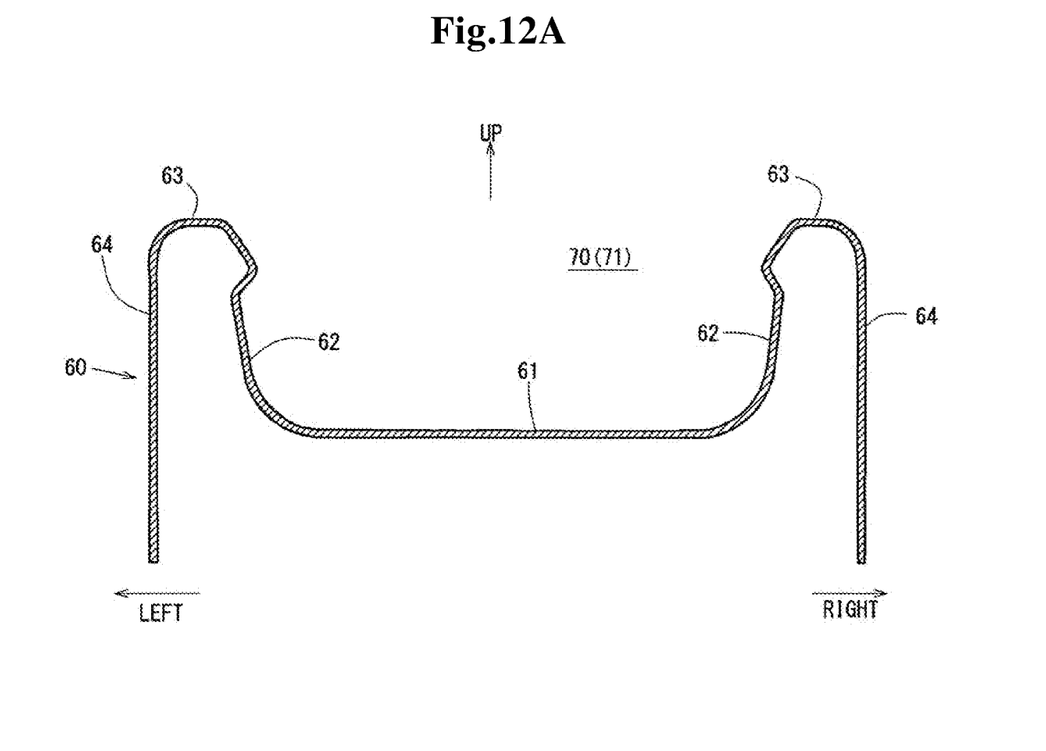
FIG. 12A is a cross sectional view illustrating a bottom part taken along line C-C in FIG. 6
Figure 12B:
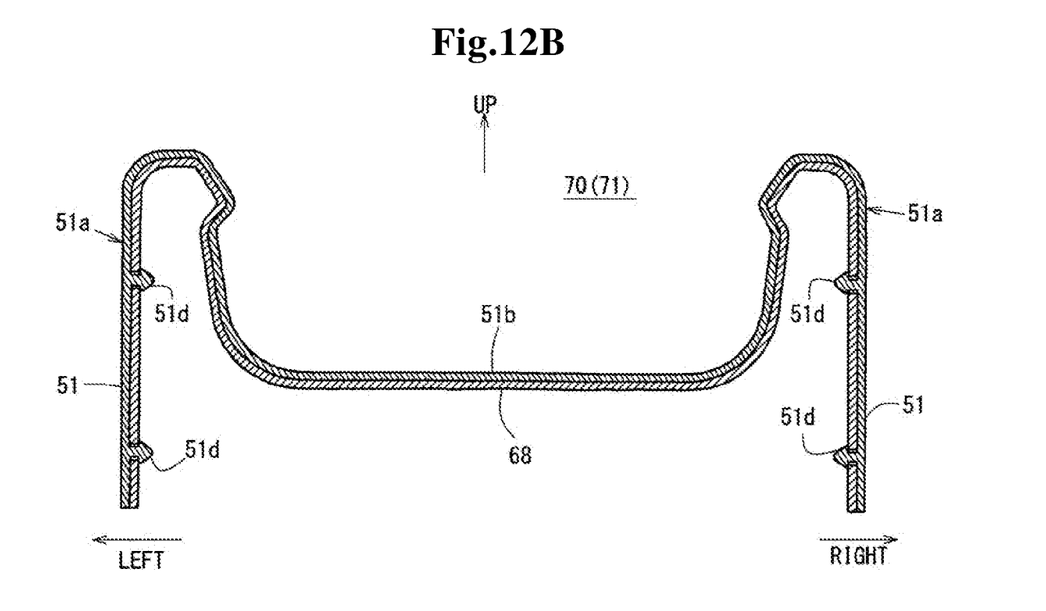
FIG. 12B is a cross sectional view illustrating a main part seen along arrows D-D in FIG. 6.

FIG. 6 is a side view illustrating a center console. FIG. 7 is a perspective view illustrating an internal frame. FIG. 8 is an enlarged side view illustrating a main part in FIG. 4. FIG. 9 is an enlarged side view illustrating a main part in FIG. 5. FIG. 10 is a cross sectional view illustrating a main part seen from arrow A-A in FIG. 1. FIG. 11 is a cross sectional view illustrating a main part seen from arrow B-B in FIG. 4. FIG. 12A is a cross sectional view illustrating a bottom part taken along line C-C in FIG. 6. and FIG. 12B is a cross sectional view illustrating a main part seen from arrow D-D in FIG. 6.

As illustrated in FIG. 1 and FIG. 6, a center console body 30 is erected on the upper surface of the tunnel part 5 as the floor surface or vehicle interior floor surface between the driver seat 7 and the passenger seat 8, has a shift operation mechanism 25 thereon, and extends in the front-rear direction from a position immediately below the instrument panel 14 to the side parts of the seat cushions 7C and 8C of the left and right seats 7 and 8.

This center console body 30 includes an internal frame 40 (see FIG. 7) made of metal that supports the shift operation mechanism 25, an outer sheath body 50 made of resin that encloses the internal frame 40 and forms a dressed surface, and a bottom part console 60 as the bottom part positioned in front of a base part member, such as base part bracket 41 in FIG. 7 which will be described later, and extends in the front-rear direction of the vehicle to a position immediately below the instrument panel 14 (see FIG. 6).

As illustrated in FIG. 7, the internal frame 40 made of metal includes the base part bracket 41 as the base part member having a hat-shaped cross section in the vehicle width direction, a lower bracket 43 formed by bending a metal plate like a rectangular column and welding and fixing necessary portions at welded parts 42, a middle bracket 44 fixed to an upper part of the lower bracket 43, and an upper bracket 45 fixed to an upper part of the middle bracket 44 and having a substantially concave cross section in the vehicle width direction and an upper member 46 is formed by the elements of the lower bracket 43, the middle bracket 44, and the upper bracket 45 disposed above the base part bracket 41. As illustrated in FIG. 6 and FIG. 7, the front side part of the internal frame 40 is slanted so that the upper member 46, for example, the upper bracket 45, is positioned forward and obliquely upward of the base part bracket 41 close to the floor surface.

Here, as illustrated in FIG. 11, the base part bracket 41 is mounted and supported on the upper surface of the tunnel part 5 by mount rubbers 47 and mounting members 48 such as bolts and nuts. In addition, the upper bracket 45 is fixed to the middle bracket 44 by mounting members 49 such as bolts and nuts.

As illustrated in FIG. 6 and FIG. 11, the outer sheath body 50 made of resin includes left and right side wall parts 51 and 51, substantially reverse U-shaped left and right fence parts 51a and 51a (see FIG. 12B) formed by extending the lower parts of the left and right side wall parts 51 and 51 forward, and a front lower part 51b that couples the inner end parts of the left and right fence parts 51a and 51a in the vehicle width direction.

On the other hand, the bottom part console 60 for which the cross sectional shape is illustrated in FIG. 12A is formed by integrally forming a bottom wall 61, inside walls 62 that rise upward from the left and right ends of the bottom wall 61, upper walls 63 that extend outward in the vehicle width direction from the upper ends of the inside walls 62, and outside walls 64 that extend downward from the outer end parts in the vehicle width direction of the upper walls 63 using synthetic resin. The shapes of the walls 62, 63, and 64 correspond to the shapes of the left and right fence parts 51a and 51a of the outer sheath body 50.

As illustrated in FIG. 6, both left and right sides of the bottom part console 60 are surrounded by the left and right fence parts 51a of the outer sheath body 50 and the rear part is surrounded by the front lower part 51b of the outer sheath body 50. In addition, as illustrated in FIG. 6, a storage part 70 is formed so that both left and right sides above the left and right fence parts 51a and both left and right sides above the upper walls 63 of the bottom part console 60 are opened to foot spaces for the driver seat 7 and the passenger seat 8. The foot spaces communicate with each other through the storage part 70.

The center console structure in the embodiment is erected on the tunnel part 5, which is the vehicle interior floor surface between the driver seat 7 and the passenger seat 8. The center console has a columnar part X that extends upward to the vicinity of the upper surfaces of the seat cushions 7C and 8C of the seats 7 and 8 and an upper body Y that is disposed above the columnar part X, extends in the front-rear direction, has the upper surface part forming a center console surface Z, and accommodates the shift operation mechanism 25 (see FIG. 6).

The columnar part X includes the base part bracket 41, the lower bracket 43, and the side wall parts 51, which are a lower area part of the outer sheath body 50, illustrated in FIG. 11. In addition, the upper body Y includes the middle bracket 44, the upper bracket 45, and an upper area part of the outer sheath body 50 described later, illustrated in FIG. 11.

As illustrated in FIG. 6 and FIGS. 8 to 10, the upper body Y is extended forward of the columnar part X, is cantilevered and has, in the front part thereof, an extension part 31 that is bent and then rises forward and obliquely upward. Although the extension part 31 is formed so as to rise at approximately 60 degrees with respect to a virtual extension line of the center console surface Z toward the front of the vehicle in the embodiment, the present application is not limited to this value.

As illustrated in FIG. 11, the upper body Y includes an upper panel 52 that forms the center console surface Z and side panels 53 positioned on both left and right sides of the upper panel 52. These panels 52 and 53 constitute an outer sheath body made of resin that forms a dressed surface.

The upper panel 52 extends in the front-rear direction of the vehicle to form the center console surface Z and integrally forms a slant surface 52a that is bent and then rises forward and obliquely upward from the front end to form a surface part of the extension part 31 close to the sitting occupant, so that the surface part of the extension part 31 close to the sitting occupant forms an outer surface continuous with the center console surface Z.

The side panels 53 extend in the front-rear direction of the vehicle to form the side walls of the center console surface Z and integrally form rising surfaces 53a that are bent and then rise forward and obliquely upward from the front ends to form the side parts of the extension part 31.

As illustrated in FIG. 10, the upper panel 52 integrally forms a folded surface 52b that is folded downward and backward from the upper end of the slant surface 52a to form the front surface of the extension part 31. In addition, the side panels 53 integrally form a front part 53b through which the front ends of the pair of left and right side panels 53 are coupled to each other in the vehicle width direction to form the front wall of the upper body Y. As illustrated in FIG. 11, along panels 54 for ornament are provided so as to include the rising surfaces 53a of the side panels 53 along both left and right sides of the side panels 53.

Step sections 51c, which are the upper ends of the side wall parts 51, are disposed via middle panels 55 on the outsides in the vehicle width direction of the left and right along panels 54. The step sections 51c are formed so as to have steps on the inside in the vehicle width direction of the side wall parts 51.

Ornament panels 56 of a substantially parallelogram shape are attached to the surfaces on the outsides in the vehicle width direction of the step sections 51c. In addition, as illustrated in FIG. 11, spacers 57 extending in the front-rear direction are disposed in the upper end parts of the middle panels 55. The spacers 57 are formed to have gate-shaped cross sections.

As illustrated in FIG. 6 and FIG. 10, a shift knob 25a of the shift operation mechanism 25 is disposed immediately above the rear of the storage part 70. As illustrated in FIG. 10, the shift operation mechanism 25 includes the shift knob 25a, a shift rod 25b, and a pivot part 25c. The pivot part 25c and the shift rod 25b are accommodated in the internal space of the upper body Y, and the shift knob 25a is disposed above the center console surface Z so as to enable a shift operation. In addition, the shift rod 25b is guided by shift guides 26 and 27 supported by the upper bracket 45.

Figure 3:
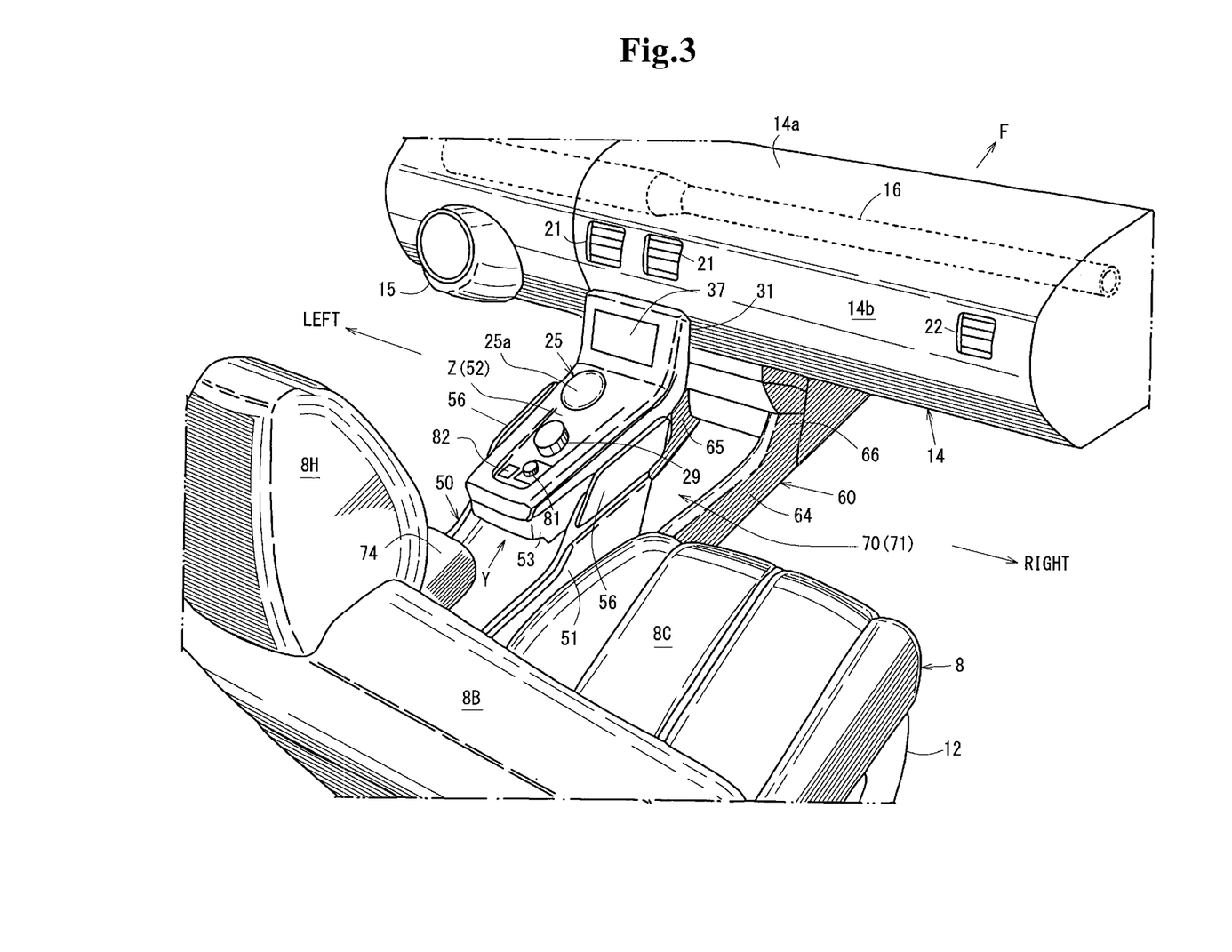
FIG. 3 is a perspective view illustrating the center console structure seen from oblique upper right of the vehicle.

As illustrated in FIG. 2, FIG. 3, and FIG. 10, a knob part 29 of a commander 28, a knob part 81 of a volume control device 80 or volume for an in-vehicle audio apparatus or the like, and a parking brake operating part 82 are provided on the center console surface Z behind the shift knob 25a.

The commander 28 is a device that selects an application section, an Internet section, a communication section, a navigation section, or a setting section by rotating the knob part 29 thereof and determines the option by pushing the knob part 29.

As for the options of each of the sections described above, the application section has fuel economy information, various kinds of maintenance information, and the like, the Internet section has an Internet radio, a portable audio, an AM/FM radio, a CD/DVD player, and the like, the communication section has a hands-free call, reading of a short message, and the like, the navigation section has road map display, route navigation, route guidance, and the like, and the setting section has the setting of sound, the adjustment of the brightness and the angle of an active driving display, and the like.

As illustrated in FIG. 10, a portion of the extension part 31 close to the front of the vehicle is locked to a rear projecting part 14d of the instrument panel 14. Specifically, an upper bracket 32 as a first engagement part is provided on the folded surface 52b of the upper panel 52 as a vehicle front portion of the extension part 31. A lower bracket 33 as a second engagement part to be engaged with the upper bracket 32 is provided in the rear projecting part 14d of the instrument panel 14. A nut 34 is connected to the lower surface of the lower bracket 33 in advance. A space G through which the brackets 32 and 33 are accessed from above is provided between the upward front edge part of the extension part 31 and the rear projecting part 14d of the instrument panel 14.

The extension part 31 is disposed close to the rear projecting part 14d of the instrument panel 14 so that the upper bracket 32 close to the extension part 31 is placed on the lower bracket 33 close to the instrument panel 14. A bolt 35 is moved downward through the space G to tighten the bolt 35 into the nut 34. The portion of the extension part 31 close to the vehicle front is thereby locked to the rear projecting part 14d of the instrument panel 14 via the brackets 32 and 33.

Here, the positions in the up-down direction of the brackets 32 and 33 are set in an invisible part spaced downward a predetermined distance from the upper end of the extension part 31 so that the sitting occupant cannot see the head of the bolt 35. In addition, as illustrated in FIG. 10, the extension part 31 accommodates a display device 36 for an air conditioner as an example of the display device that displays vehicle-related information and a display surface 37 of the display device 36 is disposed in a surface part, such as the slant surface 52a, close to the sitting occupant.

As illustrated in FIG. 10, the extension part 31 accommodates a display device 36 for an air conditioner as an example of the display device for displaying vehicle-related information and a display surface 37 of the display device 36 is disposed in the side surface part or slant surface 52a of the sitting occupant.

In the embodiment, the display device 36 including the display surface 37 is configured by a touch panel type display device and the display device 36 is configured so that the sitting occupant can see the entire display surface 37 even when the shift knob 25a is shifted to the most front position or parking position as illustrated in FIG. 10.

As illustrated in FIG. 8 and FIG. 9, a storage space 71 is formed between the upper body Y including the center console surface Z and the tunnel part 5 as the floor surface and the upper part of the storage space 71 is separated by the upper body Y. The lower part thereof is separated by the bottom wall 61 (see FIG. 12A) and the front lower part 51b (see FIG. 12B) as the floor surfaces, the rear part thereof is separated by the columnar part X. Both left and right sides thereof are separated by the side walls 62 and 64 that are wall parts lower than the upper surfaces of the seat cushions 7C and 8C.

As illustrated in FIG. 10, the upper body Y projects forward of the columnar part X until the upper body Y reaches the rear projecting part 14d of the instrument panel 14. A bulge part 38 that accommodates the shift rod 25b and the pivot part 25c, which are lower parts of the shift operation mechanism 25, is formed on the side of the lower surface of the middle in the vehicle width direction of the upper body Y. As illustrated in FIG. 8 and FIG. 9, a front edge 38a of the bulge part 38 is positioned closer to the front of the vehicle than a front edge Xa of the columnar part X that is the rear edge of the input or output a right and left side take in/out opening of the storage space 71 in side view of the vehicle.

In FIG. 8 and FIG. 9, slanted walls 65 and 66, which are left and right wall parts extending forward and obliquely upward, are formed integrally with the side walls 62 and 64 of the bottom part console 60. On the left side of the vehicle, as illustrated in FIG. 8, the rear end part of the slanted wall 65 is a front edge 65a of the storage space 71. On the right side of the vehicle, as illustrated in FIG. 9, the rear end part of the slanted wall 66 is a front edge 66a of the storage space 71.

Accordingly, in the embodiment, the front edge Xa of the columnar part X, the front edge 38a of the bulge part 38, and the front edges 65a and 66a of the left and right wall parts of the storage space 71 are formed as shapes that are slanted upward toward the front and have the same slanted angle. A kneepad member 67 is shown in FIG. 8.

As illustrated in FIG. 8 and FIG. 9, the lower front side of the columnar part X and the wall parts, that is, the inside walls 62, the upper walls 63, the outside walls 64, of the bottom part console 60 are the outer sheath body and formed so that the left and right outer surfaces are flush with each other.

Specifically, the inside walls 62, the upper walls 63, and the outside walls 64 are the outer sheath body and, as illustrated in FIGS. 12A-12B, formed so that the front lower part 51b of the columnar part X is flush with the bottom wall 61 of the bottom part console 60 and the fence parts 51a of the columnar part X are flush with the walls 62, 63, and 64 of the bottom part console 60.

Here, the fence parts 51a and the front lower part 51b are formed integrally with the side wall parts 51 included in the outer sheath body 50. In addition, as illustrated in FIG. 8 and FIG. 9, a parting line PL that divides the outer sheath body into the front and rear parts in the wall parts, which include the elements 61, 62, 63, 64, 51a, and 51b, is provided.

In the embodiment, as illustrated in FIG. 8 and FIG. 9, in the rear end part of the bottom part console 60, a stepped-down part 68 corresponding to the thickness of the fence parts 51a and the front lower part 51b is integrally formed and the fence parts 51a and the front lower part 51b are disposed on this stepped-down part 68 to ensure the flush structure of the outer sheath body.

As illustrated in FIG. 12B, on the outer side parts of the fence parts 51a of the side wall part 51 close to the columnar part X, a plurality of clips 51d projecting inward is formed integrally and the outside parts of the fence parts 51a are fitted to the outside walls 64 close to the bottom part console 60 illustrated in FIGS. 12A-12B by the clips 51d.

As illustrated in FIG. 6, a front side cup holder 72 as a second storage space is provided behind the columnar part X, a rear side cup holder 73 as a third storage space is provided behind the front side cup holder 72, and an arm rest part 74 also functioning as an open/close lid for the rear side cup holder 73 is provided above the rear side cup holder 73.

In FIG. 9, a bag 90 is an example of baggage placed so as to be easily transferred to or from the storage part 70. In addition, arrow F in the drawing represents the front side of the vehicle, arrow R represents the rear side of the vehicle, and arrow LEFT represents the left side of the vehicle width direction, arrow RIGHT represents the right side of the vehicle width direction, and arrow UP represents the upper side of the vehicle.

The center console structure according to the embodiment is a center console structure that is disposed between the driver seat 7 and the passenger seat 8 and has the shift operation mechanism 25 thereon and includes the columnar part X that is erected on the vehicle interior floor surface, such as the tunnel part 5, between the driver seat 7 and the passenger seat 8 and extends upward to the vicinity of the cushion surfaces, for example, the upper surfaces of the seat cushions 7C and 8C, of the seats 7 and 8 and the upper body Y that is disposed above the columnar part X, extends in the front-rear direction, has the upper surface part forming the center console surface Z, and accommodates the shift operation mechanism 25, in which the upper body Y extends forward of the columnar part X, is cantilevered, and has, in the front part thereof, the extension part 31 that is bent and then rises forward and obliquely upward, the surface part of the extension part 31 close to the sitting occupant forms an outer surface continuous with the center console surface Z, and the portion of the extension part 31 close to the front of the vehicle is locked to the rear projecting part 14d of the instrument panel 14 (see FIG. 1, FIG. 4, FIG. 5, and FIG. 10).

In this structure, the visual floating feeling of the upper body Y can be provided for the occupant by terminating the extension part 31 of the upper body Y of the center console in the proximity of the rear projecting part 14d of the instrument panel 14. On the other hand, the supporting strength of the upper body Y can be obtained even when the upper body Y has a cantilever shape by locking the portion of the extension part 31 close to the front of the vehicle to the rear projecting part 14d of the instrument panel 14.

In addition, in one embodiment of the present application, the display device 36 that displays vehicle-related information is accommodated in the extension part 31 and the display surface 37 is disposed in the surface part close to the sitting occupant (see FIG. 10). In this structure, by providing the display device, which is originally provided in the instrument panel 14, in the extension part 31 that rises forward and obliquely upward of the center console, the display device 36 can be disposed close to the occupant, the visibility of the display surface 37 is improved, the instrument panel 14 can be simplified, and application to the display device 36 of a touch panel type also becomes effective.

In addition, in one embodiment of the present application, the first engagement part, for example, the upper bracket 32, is provided in a portion of the extension part 31 close to the front of the vehicle and the second engagement part, for example, the lower bracket 33, to be engaged with the first engagement part, the upper bracket 32, is provided in the rear projecting part 14d of the instrument panel 14, and the space G through which the first engagement part and the second engagement part, the brackets 32 and 33, are accessed from above for engagement is provided between the upper front edge part of the extension part 31 and the rear projecting part 14d of the instrument panel 14 (see FIG. 10).

In this structure, because the first engagement part, the upper bracket 32, close to the extension part 31 can be surely engaged with the second engagement part, the lower bracket 33, close to the instrument panel 14 and engagement work for both engagement parts, the brackets 32 and 33, can be performed by access through the space G, the workability thereof can be improved.

In addition, because the front end part, the front end part of the extension part 31, of the upper body Y seems to the sitting occupant to float in the rear projecting part 14d of the instrument panel 14 due to the space G, visual floating feeling can be improved.

In correspondence between the present application and the embodiment, the vehicle interior floor surface in the present application corresponds to the tunnel part 5 in the embodiment. Similarly, the first engagement part corresponds to the upper bracket 32 and the second engagement part corresponds to the lower bracket 33, but the present application is not limited to only the structure of the embodiment.

For example, although the center console structure is applied to a left-hand drive vehicle in the embodiment, the center console structure according to the present application may be applied to a right-hand drive vehicle.

INDUSTRIAL APPLICABILITY

As described above, the present application is useful for a center console structure that is disposed between a driver seat and a passenger seat and has a shift operation mechanism thereon.

DESCRIPTION OF REFERENCE SIGNS AND NUMERALS

5: tunnel part or vehicle interior floor surface
7: driver seat
8: passenger seat
14: instrument panel
14d: rear projecting part
25: shift operation mechanism
31: extension part
32: upper bracket or first engagement part
33: lower bracket or second engagement part
36: display device
37: display surface
G: space
X: columnar part
Y: upper body
Z: center console surface

The invention claimed is:

1. A center console structure that is disposed between a driver seat and a passenger seat and has a shift operation mechanism thereon, the center console structure comprising:
a columnar part erected on a vehicle interior floor surface between the driver seat and the passenger seat, the columnar part extending upward to vicinity of cushion surfaces of the seats; and
an upper body that is disposed above the columnar part, extends in a front-rear direction, has an upper part forming a center console surface, and accommodates the shift operation mechanism,
wherein
the upper body extends forward of the columnar part and is cantilevered, has, in a front part thereof, an extension part that is bent and then rises forward and obliquely upward, a surface part of the extension part close to a sitting occupant forms an outer surface continuous with the center console surface, and a portion of the extension part close to a front of the vehicle is locked to a rear projecting part of an instrument panel;
a first engagement part is provided in a portion of the extension part close to the front of the vehicle,
a second engagement part to be engaged with the first engagement part is provided in the rear projecting part of the instrument panel, a space through which the first engagement part and the second engagement part are accessed from above for engagement is provided between an upper front edge part of the extension part and the rear projecting part of the instrument panel, and the first engagement part and the second engagement part are vertically positioned relative to each other between an upper end of the extension part and the rear projecting part of the instrument panel, and spaced downward a predetermined distance from the upper end of the extension part so that the sitting occupant cannot see a fastener engaging the first and second engaging parts.

2. The center console structure according to claim 1, wherein a display device that displays vehicle-related information is accommodated in the extension part and a display surface is disposed in the surface part close to the sitting occupant.

\* \* \* \* \*